Oct. 14, 1969 R. C. WONSON 3,473,046

PIEZOJUNCTION-CONTROLLED MULTIVIBRATOR CIRCUIT

Filed Dec. 2, 1965 2 Sheets-Sheet 1

INVENTOR
ROGER C. WONSON
BY [signature]
AGENT

INVENTOR
ROGER C. WONSON
BY [signature]
AGENT

United States Patent Office 3,473,046
Patented Oct. 14, 1969

3,473,046
PIEZOJUNCTION-CONTROLLED MULTIVIBRATOR CIRCUIT

Roger C. Wonson, Beverly, Mass., assignor to Raytheon Company, Lexington, Mass., a corporation of Delaware Filed Dec. 2, 1965, Ser. No. 511,083
Int. Cl. H03k *3/281*
U.S. Cl. 307—308 8 Claims

ABSTRACT OF THE DISCLOSURE

A piezojunction-controlled multivibrator circuit in which a stress-sensitive piezojunction transistor acts as a variable capacitance enabling the output of the circuit to be varied.

This invention relates to digital output circuits and particularly to multivibrator circuits employing solid state transducer components utilizing the piezojunction effect.

The performance characteristics of solid state transducers are determined to a great extent by specific phenomena associated with various semiconducting materials. Although these devices represent the present state of the art, they still result in low level analog output signals which require various external signal conditioning functions to make them compatible with associated telemetry systems, for example. Conventional approaches not only introduce extraneous electrical parameters into transducer output signals but also reach a point of intolerable complexity due to the number of transducers and supporting equipment at a single data acquisition point. In accordance with the present invention, conventional techiques have been abandoned in favor of new transducing techniques which are directly interchangeable with conventional techniques but which are inherently capable of performing all of the necessary functions at the one point of data acquisition.

One of the primary objective of this invention is to utilize the molecular or functional block approach to convert mechanical and environmental stimuli such as temperature, pressure, acoustical, velocity, gravitational fields and nuclear radiation, directly into a digital electrical signal, and wherein the molecular of functional transducing block is capable of sensing the desired stimuli and inherently performing the necessary signal conditioning functions to provide a digital electrical signal of sufficient amplitude over the entire range of the measured stimuli, thereby alleviating the need for any additional conditioning from the point of data acquisition to the input of the associated telemetry system.

By "digital output" is meant a transducer output which represents the magnitude of the stimuli in the form of discrete quantities coded to represent digits in a system of notations or, more generally, information conveyed by the numbers of complete cycles in a unit interval which may be counted by a digital counter.

In accordance with this invention there has been provided a novel multivibrator circuit which employs semiconductor elements at least one of which exhibits the piezojunction principle or effect, and which is adaptable to individual component circuitry or to integrated circuitry.

The piezojunction principle or effect referred to here is the anisotropic stress effect which is found with the piezojunction, a very shallow junction of silicon or germanium whose resistance changes markedly in both the forward and backward directions when pressure with a fine point is applied to it. It has been found that a semiconductor body, either a diode or a transistor, exhibits such effects if the plane of the junction which is being stressed lies not more than about one micron from a surface upon which pressure is applied by a stylus having a point with a radius not greater than about 250 microns. Such a piezojunction device or transducer is fully described in copending U.S. patent application Ser. No. 261,065, filed Feb. 26, 1963, by Wilhelm Rindner, and assigned to the same assignee as the present application.

The Rindner invention is predicated upon the discovery that anisotropic stress in a piezojunction device subjected to appropriate stress manifests itself as a very large and reversible resistance change in the P–N junction of the device by factors up to several orders of magnitude.

The problem of harnessing this effect to perform practical transducing functions is quite formidable, especially considering the minute dimensions involved. A very satisfactory solution to a portion of the packaging problem is fully set forth in copending U.S. patent application Ser. No. 501,254, filed Oct. 22, 1965, by Gerhard Doering and assigned to the same assignee as the present application.

The piezojunction device, when used in the presently described circuit, has been found to produce greatly improved results, stability, and a remarkable degree of miniaturization which enables such circuits to be satisfactorily employed in apparatus where conventional circuits cannot be used. The piezojunction device of this invention is a transistor wherein the emitter-base junction is stressed by pressure induced by a stylus to produce frequency modulation of pulse width modulation, with the number of output pulses per second providing a digital measurement of the stress input or the measurement of pulse width.

The multivibrator circuit embodying the present invention comprises, in one embodiment, a transistor having its emitter-base junction disposed at not more than about one micron from a surface upon which stress is to be applied by a stylus having a point with a radius not greater than about 250 microns, as fully described in aforementioned copending application Ser. No. 261,065. The transistor may be a separate element or may be part of an integrated circuit, as will be described.

It is known that stressing of the emitter-base junction as taught in said copending application will normally reduce the gain ($h_{fe}$) and that the output capacity ($C_{oe}$) is a function of gain. With increasing stress there is produced a corresponding decrease in output capacity in a substantially linear relationship.

In one embodiment of the invention the multivibrator operates in an astable mode. A stress-sensitive or piezojunction transistor is employed in the circuit, and as stress is applied to the junction of this transistor the output capacity $C_{oe}$ is reduced. This causes the output pulse repetition rate to increase with increased applied stress.

In another embodiment of the invention the multivibrator operates in a monostable mode and included in the circuit thereof is a piezojunction transistor as described above. In this embodiment the circuit is a flip-flop which is reset periodically by a trigger pulse from a timing generator. The piezojunction device starts charging at the start of a timing cycle. During this cycle, the piezojunction is stressed, and as the stress increases, the time interval for the piezojunction device to reach the critical voltage is shortened. When the critical voltage is reached the circuit flips. This device is particularly useful for pulse code modulation.

Other advantages and objectives of this invention will be apparent from the following description taken in connection with the accompanying drawings, wherein.

Figure 1:
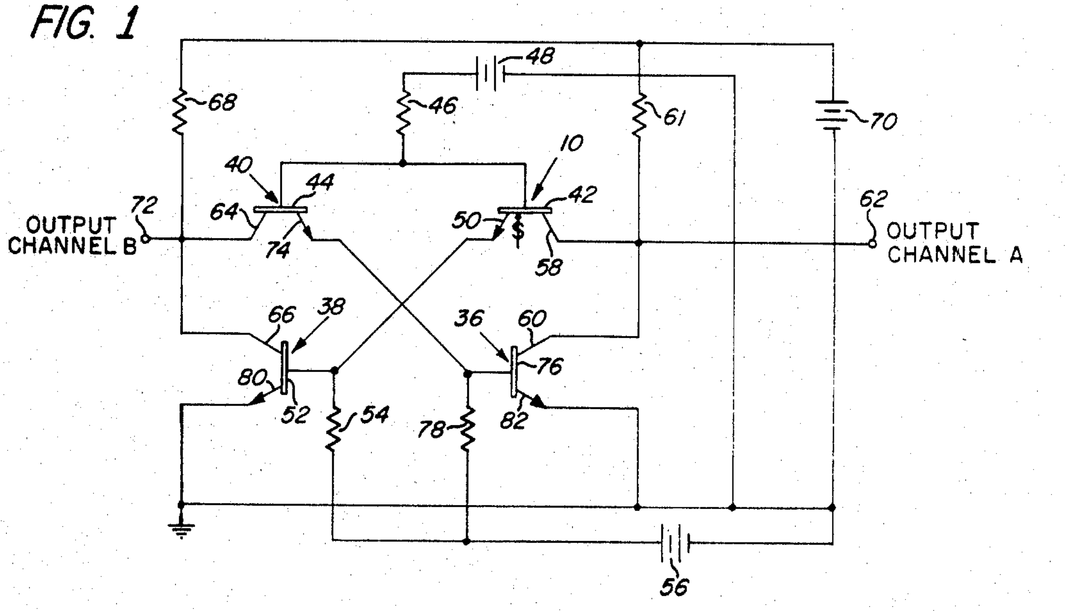
FIG. 1 is a schematic circuit diagram of an astable multivibrator embodying the invention.
Figure 2:
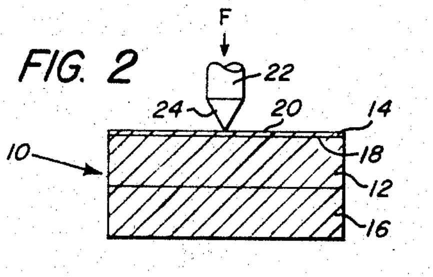
FIG. 2 is a schematic diagram illustrating a stress-sensitive piezojunction transistor utilized in the circuit of FIG. 1.

In FIG. 1 there is shown a multivibrator circuit including a stress-sensitive piezojunction device 10. Device 10 is a conventional transistor wherein the emitter-base junction lies at a distance not more than about one micron from the emitter surface to which stress is to be applied, which surface is substantially parallel to the junction as shown diagrammatically in FIG. 2. The transistor 10 comprises the usual structure of silicon or germanium which includes a base electrode portion 12 of one conductivity type separating opposite conductivity type layers 14 and 16 which comprise the emitter and collector electrodes respectively. The layers 12, 14 and 16 may be N-P-N or P-N-P. The transistor 10 may be very small, such as one millimeter long, one millimeter wide and one-quarter to one-half millimeter thick, for example. The transistor may be of conventional structure and may be made by conventional processes except in the one respect that the thickness of the emitter 14 is not greater than about one micron, and the interface between layers 14 and 12 forms a rectifying barrier of P-N junction 18 which is substantially parallel with the portion of the adjacent surface 20 to which stress is to be applied by a very small point on a stylus 22. Such a stress-sensitive or piezojunction transistor is fully described in the aforementioned Rindner copending application Ser. No. 261,065, and from that description it is clear that a stylus 22 is utilized to provide anisotropic stress to a small area of the junction 18 when the stylus has a bearing point 24 which has a radius of curvature not greater than about 250 microns and which is brought to bear upon surface 20. This has been found to produce resistance changes in the junction by factors up to 10,000 by stress forces F of less than ten grams.

The assembly of a piezojunction transistor 10 with stressing means may be achieved by any suitable structure such as, for example, the package shown and described in the aforementioned Doering copending application Ser. No. 501,254, wherein a piezojunction transistor 26 (FIG. 3) is mounted on a header 28 and a stylus 30 is supported on the under side of a flexible diaphragm 32 which encloses one end of a can 34 mounted on the header in encircling relation to the transistor. In such a device, details of which can be obtained from said Doering application, any pressure upon the diaphragm 32 will tend to move the diaphragm and stylus 30 thereon in a direction toward the piezojunction transistor 26, the stylus thus introducing anisotropic stress in the shallow emitter-base P-N junction within the transistor as described above.

Figure 3:
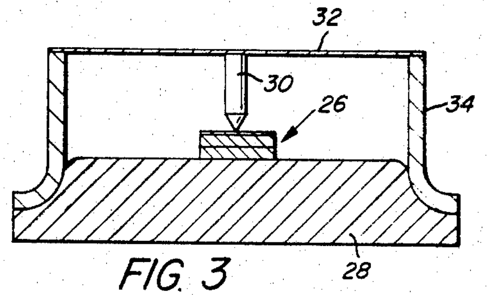
FIG. 3 is a vertical sectional view through a package device in which a piezojunction transistor is incorporated.

It will be apparent that a circuit such as shown in FIG. 1 can be easily combined with the device of FIG. 3, with leads to the exterior of the package being provided by extending wires through insulated openings in the header 28 or can 34.

Referring again to FIG. 1, the astable multivibrator circuit shown includes the piezojunction transistor 10 and three additional conventional transistors 36, 38 and 40. Piezojunction transistor 10 has its base 42 connected to the base 44 of transistor 40 and both are connected through a resistor 46 to voltage source such as battery 48. Emitter 50 is connected to the base 52 of transistor 38. Both emitter 50 and base 52 are connected through a resistor 54 to a voltage source such as battery 56. The collector 58 of piezojunction transistor 10 is connected to the collector 60 of transistor 36 and both are also connected to output terminal 62, and through a resistor 61 to a voltage source such as battery 70. The collector 64 of transistor 40 is connected to the collector 66 of transistor 38. Both are connected through resistor 68 to battery 70 and are also connected to a second output terminal 72. Emitter 74 of transistor 40 is connected to the base 76 to voltage source 56. Emitters 80 and 82 of transistors 38 and 36 respectively are grounded.

In one exemplary circuit structure, battery 48 provides a voltage of about 6.3 volts, battery 56 provides a voltage of about two volts, and battery 70 provides a voltage of about 12 volts. In the same example, resistors 46, 61 and 68 each have a value of about 10 kilohms, and resistors 54 and 78 each about 8.3 kilohms.

In the operation of this circuit it is to be understood that the frequency is dependent upon the time constants of the output capacity of transistor 40 and resistor 78 and also the output capacity of piezojunctiont ransistor 10 and resistor 54. It will be seen that transistor 40 and piezojunction transistor 10 are utilized as stored charge capacitors. Transistors 36 and 38 are used as conventional active elements in the multivibrator. The base circuits of transistors 38 and 36 are returned through resistors 54 and 78 respectively to the bias source 56 which is positive. The frequency of the astable multivibrator is determined by the longest time constant in the multivibrator circuit. In this circuit the components are selected so that the longest time constant will be the piezojunction transistor 10 and resistor 54.

With transistor 36 off, transistor 38 is saturated. Switching occurs when the base of the "off" transistor goes far enough above cut-off so that loop gain exceeds unity. Then transistor 38, which was saturated, is driven "off," while the "off" transistor 36 is turned on. The base voltage on the stored charge transistors 40 and 10 supplied through resistor 46 from source 48 establishes the necessary base current to bias these transistors for proper output capacitance value.

Figure 4:
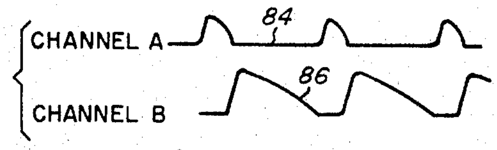
FIG. 4 illustrates waveforms produced by the circuit of FIG. 1 when the piezojunction transistor therein is unstressed.

The waveforms 84 and 86 at the output 72 of transistor 38 (Channel B) and at the output 62 of transistor 36 (Channel A) respectively are shown in FIG. 4. These waveforms indicate an output frequency of about 500 kc. and are produced with normal operation of the piezojunction device 10, no stressing being applied. However, when stress is applied to the piezojunction transistor 10 in the manner described hereinbefore, its output capacity is reduced. The output capacity of transistor 10 is a function of its Beta ($h_{fe}$), as is taught by M. V. Joyce and K. K. Clark in "Transistor Circuit Analysis," page 249, published by Addison W. Wesley Publishing Co. The gain of the transistor can be controlled by the stress applied by a stylus to the junction of the piezojunction transistor 10 as discussed in the aforementioned Rindner application.

Figure 5:
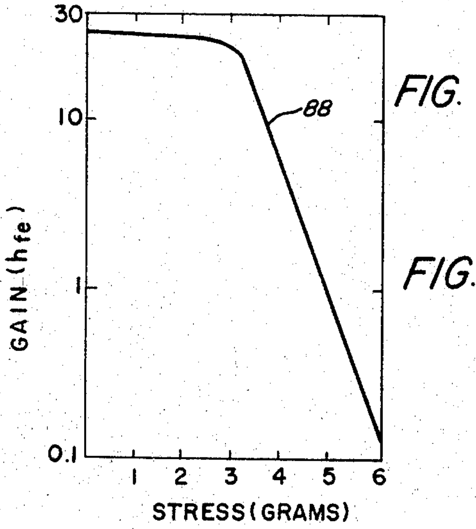
FIG. 5 is a graph illustrating changes in gain vs. stress of a multivibrator according to FIG. 1.

FIG. 5 shows the gain vs. stress relationship and it will be apparent from curve 88 that gain decreases with increased stress.

Figure 6:
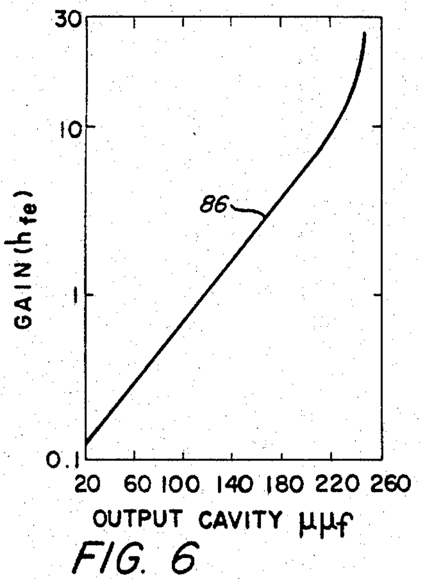
FIG. 6 is a graph illustrating gain vs. capacity of a multivibrator according to FIG. 1.

FIG. 6 shows output capacity of a transistor vs. gain wherein stress is being decreased, and from curve 90 it will be apparent that output capacity increases with increasing gain. It will be understood that the opposite is also true, that is, that output capacity will decrease with decreasing gain and increasing stress.

Figure 7:
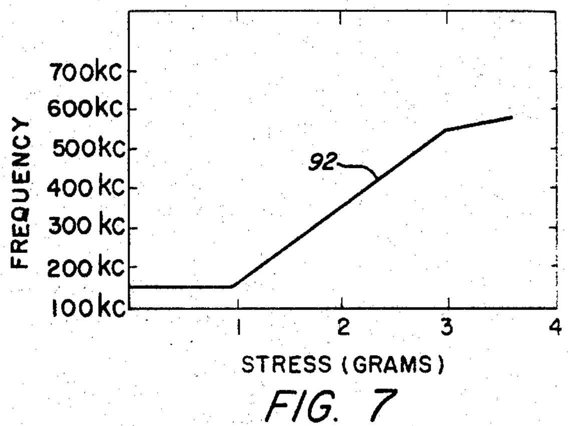
FIG. 7 is a graph illustrating changes in frequency resulting from stressing the piezojunction transistor in the multivibrator of FIG. 1.

Because this section of the circuit, that is, the piezojunction transistor 10 and resistor 54, control the frequency of the astable multivibrator as explained above, the frequency will be increased as force are increasingly applied to stress the P-N junction. This is depicted in FIG. 7 which shows the change in frequency of one particular multivibrator circuit of the invention which occurs as increasing forces are applied to the piezojunction stress-sensitive transistor 10. From curve 92 it will be apparent that with increasing force the frequency also increases, while output capacity and gain decrease as pointed out above. This increase in frequency is according to the well-known formula $$T=RC_{l_n}\left[\frac{Vcc}{Vcc-Vce}\right]$$

where R is the load resistance 54, C is the output capacity of the transistor 10, $l_n$ is the natural log, $Vcc$ is the collector load supply voltage, and $Vce$ is the collector-to-emitter voltage. The output frequency change of the circuit of FIG. 1 with three grams of force applied to stress the junction in transistor 10 causes a reproducible change of 400 kc., from 150 to 550 kc., for example.

Figure 8:
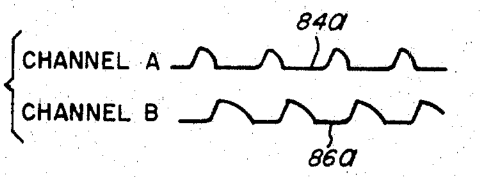
FIG. 8 illustrates waveforms produced by the circuit of FIG. 1 when the piezojunction transistor therein is stressed.

The output wave forms when the piezojunction transistor is stressed with about eight grams of force are shown in FIG. 8 wherein it will be seen that the output waveforms **84*a* and 86*a*** from Channels A and B of another multivibrator indicate an increase in frequency to about one megacycle or 60 cycles per dyne sensitivity. The frequency is determined by the equation:

$$T=C\left[C_{b'e}+\frac{a}{r_e}R_LC_{b'e}\right]\ln\left[1+\frac{Vcc}{Vbb}\right]$$

where R=10K, $Vcc=12$ volts, $Vbb=1.5$ volts, $I_e=0.25$ ma., $h_{fe}=25$ and $C_{oe}=70$ pf.+15 pf. stray. Substituting these values in the above equation $T=1.86$ sec. or 530 kilocycles. The measured pulse repetition frequency equalled 499.6 kc. With stress applied, $C_{oe}$ was reduced to 30 pf. with the resultant calculated frequency of 1.01 mc. The measured frequency was 1.25 mc.

It was found that the resulting frequencies were quite stable, being affected only slightly by temperature changes. The invention provides multivibrator circuits with a reduction from the usual levels of B+ voltages, with small signal vs. avalanche on large signal operation, with less dependence on the frequency on the level of B+ voltages, and more conveniently adapted to operation in systems where master clock triggering is required.

Figure 9:
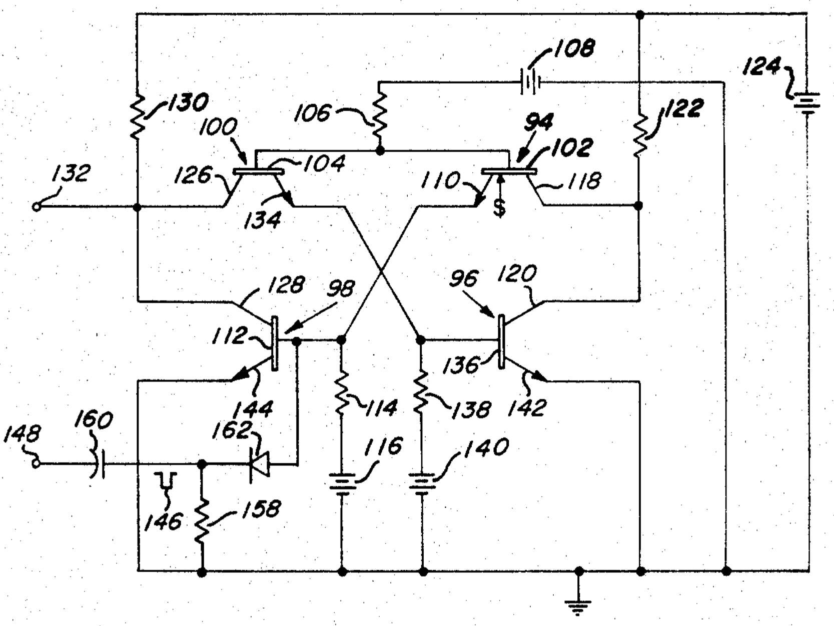
FIG. 9 is a schematic circuit diagram of a monostable multivibrator embodying the invention.

In FIG. 9 is shown a monostable multivibrator embodying the invention. In this circuit the piezojunction transistor 94 is interconnected with three conventional transistors, 96, 98 and 100. Piezojunction transistor 94 has its base 102 connected to the base of transistor 100 and both are connected through a resister 106 to a voltage source such as battery 108. Emitter 110 is connected to the base 112 of transistor 98. Both emitter 110 and base 112 are connected through a resistor 114 to a voltage source such as battery 116. The collector 118 of piezojunction transistor 94 is connected to the collector 120 of transistor 96 and both are also connected through a resistor 122 to a voltage source such as battery 124. The collector 126 of transistor 100 is connected to the collector 128 of transistor 98. Both are connected through resistor 130 to battery 124 and are also connected to an output terminal 132. Emitter 134 of transistor 100 is connected to the base 136 of transistor 96 and both are connected through resistor 138 to voltage source 140. Emitters 142 and 144 of transistors 96 and 98 respectively are grounded.

In one example of the circuit of FIG. 9, battery 108 provides a voltage of about 4 volts, battery 124 a voltage of about 14.8 volts, battery 116 a voltage of about 6.8 volts, and battery 140 a voltage of about 2.3 volts. In the same example, resistors 106, 114, 130, 122 and 138 have a value of about 10K.

The circuit of FIG. 9 is triggered by a negative pulse 146 from any suitable pulse generator (not shown) which is coupled to input terminal 148 through a coupling network including capacitor 160 and diode 162, with a resistor 158 being provided to allow for a d.c. return to ground. This trigger pulse thus is applied to the base 112 of transistor 98. The pulse generator may be any known type which is capable of producing a negative pulse of, for example, about one volt in amplitude and about 0.1 microsecond width, such as the pulse generator made and sold by General Radio Company of Concord, Mass., and listed in their catalog as Model 1217B.

In the operation of the multivibrator of FIG. 9, transistor 96 is in the off condition and transistor 98 is in the on or conducting state because of the larger positive bias source 116. The circuit will stay in this condition until a negative trigger pulse of 100 kc., for example, is applied to the base of transistor 98. This pulse, being negative, will turn off transistor 98 and turn on transistor 96, because the base of transistor 96 will become more positive, causing the circuit to flip in the normal manner of monostable multivibrators. The trigger pulse width is intentionally made to be much narrower than the duty cycle of the multivibrator, which duty cycle may be greater than one microsecond, for example.

After the trigger has turned transistor 98 off, it will stay off until the time constant of resistor 114 and piezojunction transistor 94 has been satisfied and transistor 98 has been turned back on, similar to the procedure described in connection with the circuit of FIG. 1. This cycle will be repeated when the next successive trigger pulses are applied.

Figures 10, 11:
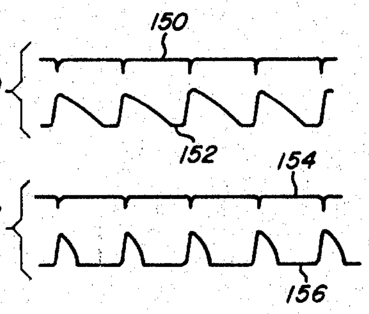
FIG. 10 illustrates waveforms produced by the circuit of FIG. 9 when the piezojunction transistor therein is unstressed.
FIG. 11 illustrates waveforms produced by the circuit of FIG. 9 when the piezojunction transistor therein is stressed.

As is well known, the frequency of the trigger pulses, as controlled by the particular pulse generator used, determines the frequency of the output pulses generated by this monostable multivibrator. In FIG. 10 there are shown two waveforms, waveform 150 being the trigger pulse waveform. However, the output waveform from transistor 98, and consequently from this monostable multivibrator, takes the form of waveform 152 when the piezojunction transistor 94 is unstressed.

When a force is applied to the piezojunction transistor 94 to stress the emitter-base junction therein, this reduces its output capacity as described hereinbefore and therefore decreases the resistor 114-transistor 94 time constant. As a result, transistor 98 is turned on sooner after each trigger pulse with a resulting narrowing of the width of each output pulse. This is illustrated in FIG. 11 where waveform 154 indicates the trigger pulses, and waveform 156 is that of the output pulses from the circuit when piezojunction transistor 94 is stressed with one selected force value.

From the foregoing it will be apparent that two novel multivibrator circuits have been provided in accordance with the objectives of this invention, one employing a piezojunction or stress-sensitive transistor for varying the output frequency of the multivibrator, and the other employing such a transistor for varying the width of the individual pulses in the output of the multivibrator. It will also be apparent that these circuits may be built in integrated form on a single block in accordance with known integrated circuit techniques or may be comprised of several separate and discrete components joined by wires in the well-known manner. In either case, it is necessary that the piezojunction transistor utilized in the circuit be provided with the shallow junction taught by the Rindner application aforementioned so that anisotropic stress may be provided uniformly within a small area of the emitter-base junction.

It is to be further understood that various modifications in this invention may be made by those skilled in the art without departing from the spirit of the invention as expressed in the accompanying claims.

I claim:

1. A multivibrator circuit for producing an output signal having given waveform characteristics, said circuit comprising:

first and second active electron devices each having input and output electrodes;

a first coupling network including a stored charge capacitance, said first network coupled from the output electrode of the second device to the input electrode of the first device;

a second coupling network exhibiting a time constant and including a stress-sensitive piezojunction semiconductor element exhibiting a varying capacitance and is operable to vary the output signal and to consequently alter said waveform characteristics in accordance with varying stresses in a junction within said element, said second network coupled between the output electrode of the first device and the input electrode of the second device;

means biasing said first device normally to be cut-off;

means biasing said second device normally to be conducting; and means for applying signals to reverse the states of said devices including the application of varying forces to said piezojunction element to produce stresses in said junction, whereby said output signal and waveform characteristics are varied.

2. An astable multivibrator circuit for producing an output signal having given waveform characteristics, said circuit comprising:

first and second active electron devices each having input and output electrodes;

a first coupling network including a transistor used as an element providing a stored charge capacitor, said first network coupled from the output electrode of the second device to the input electrode of the first device;

a second coupling network exhibiting a time constant and including a stress-sensitive piezojunction transistor exhibiting a varying capacitance and is operable to vary the output signal and to consequently alter said waveform characteristics in accordance with varying stresses in a junction within said transistor, said second network coupled between the output electrode of the first device and the input electrode of the second device;

means biasing said first device normally to be cut-off;

means biasing said second device normally to be conducting; and means for applying signals to reverse the states of said devices including the application of varying forces to said piezojunction transistor to produce stresses in said junction, whereby said output signal and waveform characteristics are varied.

3. A circuit as set forth in claim 2 wherein said stress-sensitive piezojunction transistor has a body containing two regions of one type conductivity and an intermediate region of opposite type conductivity, said regions being separated from one another by P-N junctions, at least one of which is disposed substantially parallel to a surface of the body and spaced one micron or less from said surface;

and wherein said means for applying forces to said transistor comprises a stylus with a point bearing on said surface of the body and having a radius of curvature not greater than 250 microns.

4. A circuit as set forth in claim 2 wherein the output signals from the multivibrator circuit when the piezojunction transistor is unstressed comprise pulses of a given frequency, and when the piezojunction transistor is stressed comprise pulses of a different frequency in accordance with the forces which are applied to the piezojunction transistor.

5. A monostable multivibrator circuit for producing an output signal having given waveform characteristics, said circuit comprising:

first and second active electron devices each having input and output electrodes;

a first coupling network including a transistor used as an element providing a stored charge capacitor, said first network coupled from the output electrode of the second device to the input electrode of the first device;

a second coupling network exhibiting a time constant and including a stress-sensitive piezojunction transistor exhibiting a varying capacitance and is operable to vary the output signal and to consequently alter said waveform characteristics in accordance with varying stresses in a junction within said transistor, said second network coupled between the output electrode of the first device and the input electrode of the second device;

means biasing said first device normally to be cut-off;

means biasing said second device normally to be conducting;

means for applying a trigger signal to said second device to cause it to stop conducting thereby driving said first device into conduction; and means for applying varying forces to said piezojunction transistor to produce stresses in said junction to control its capacitance and the time constant of said second coupling network to control the conduction time of said first device, whereby said output signal and waveform characteristics are varied.

6. A circuit as set forth in claim 5 wherein said stress-sensitive piezojunction transistor has a body containing two regions of one type conductivity and an intermediate region of opposite type conductivity, said regions being separated from one another by P-N junctions, at least one of which is disposed substantially parallel to the surface of the body and spaced one micron or less from said surface;

and wherein said means for applying forces to said transistor comprises a stylus with a point bearing on said surface of the body and having a radius of curvature not greater than 250 microns.

7. A multivibrator circuit as set forth in claim 5 wherein the frequency of said trigger signals determines the frequency of the output signals of the circuit.

8. A circuit as set forth in claim 1 wherein the output signal when the piezojunction transistor is stressed comprises pulses of different pulse width in accordance with the forces which are applied to the piezojunction transistor.

References Cited

UNITED STATES PATENTS

| | | | |
|---|---|---|---|
| 2,368,278 | 1/1945 | Warshaw | 331—65 |
| 2,639,858 | 5/1953 | Hayes | 331—65 |
| 2,907,897 | 10/1959 | Sander | 331—65 |
| 2,990,480 | 6/1961 | Elssworth | 307—273 |
| 2,939,966 | 6/1960 | Abraham | 307—300 |
| 3,000,208 | 9/1961 | Piazza | 307—308 |
| 3,201,602 | 8/1965 | Norwalt | 307—273 |
| 3,292,057 | 12/1966 | Touchy | 307—308 |

DONALD D. FORRER, Primary Examiner

HAROLD A. DIXON, Assistant Examiner

U.S. Cl. X.R.

73—88.5, 398; 331—65, 113